(12) United States Patent
Scott et al.

(10) Patent No.: US 11,766,955 B1
(45) Date of Patent: Sep. 26, 2023

(54) VEHICLE OCCUPANCY ALARM ASSEMBLY

(71) Applicants: Jermaine Scott, Ralph, AL (US); Tony Woods, Ralph, AL (US)

(72) Inventors: Jermaine Scott, Ralph, AL (US); Tony Woods, Ralph, AL (US)

( * ) Notice: Subject to any disclaimer, the term of this patent is extended or adjusted under 35 U.S.C. 154(b) by 0 days.

(21) Appl. No.: 17/701,803

(22) Filed: Mar. 23, 2022

(51) Int. Cl.
*B60N 2/00* (2006.01)
*G08B 21/22* (2006.01)
*G08B 21/24* (2006.01)

(52) U.S. Cl.
CPC ............. *B60N 2/002* (2013.01); *G08B 21/22* (2013.01); *G08B 21/24* (2013.01)

(58) Field of Classification Search
CPC ........ G08B 21/24; G08B 21/22; G08B 21/02; G08B 21/00; B60N 2/002
See application file for complete search history.

(56) References Cited

U.S. PATENT DOCUMENTS

| 9,569,948 | B1 | 2/2017 | Platt |
| D900,649 | S | 11/2020 | Fischer |
| 2009/0079557 | A1 | 3/2009 | Miner |
| 2011/0109450 | A1 | 5/2011 | Hirschfield |
| 2013/0194089 | A1* | 8/2013 | Estrada .................... B60N 2/28 340/584 |
| 2014/0052342 | A1* | 2/2014 | Seibert ................ B60N 2/2812 701/45 |
| 2016/0350984 | A1* | 12/2016 | Tieman .................. G07C 5/008 |
| 2017/0015240 | A1 | 1/2017 | Jacobs |
| 2017/0043783 | A1* | 2/2017 | Shaw .................... B60N 2/002 |
| 2018/0053390 | A1 | 2/2018 | Morris |
| 2021/0086663 | A1 | 3/2021 | Jackson |
| 2021/0221328 | A1 | 7/2021 | Naeem |

FOREIGN PATENT DOCUMENTS

WO WO2006113734 10/2006

* cited by examiner

*Primary Examiner* — Brian Wilson

(57) ABSTRACT

A vehicle occupancy alarm assembly includes an alert unit that has an input port which is compatible with an on board diagnostic port thereby facilitating the alert unit to be placed in electrical communication with a computer system of a vehicle. The alert unit is actuatable into a first condition to emit an audible alert when the alert unit detects that a rear seat belt is coupled thereby alerting a driver of the vehicle that a passenger is buckled into the rear seat belt. The alert unit is actuatable into a second condition to emit an audible alert when the alert unit detects that the driver's side door is ajar thereby alerting the driver to check for a passenger in the rear seat. The alert unit is actuatable into a third condition to emit an audible alert when the alert unit detects that the vehicle transmission has been placed in a parking gear thereby alerting the driver to check for a passenger in the rear seat.

3 Claims, 7 Drawing Sheets

VEHICLE OCCUPANCY ALARM ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to occupancy alarm device and more particularly pertains to a new occupancy alarm device for reminding a driver to check for a passenger in a rear seat of a vehicle. The device includes an alert unit that has an input port that can be plugged into an on board diagnostic port of a vehicle. The device includes a switch that is positionable in a seat belt position, a door lock position or a stop position. In this way the alert unit emits an audible alert either when the rear seat belt is coupled, or the driver's side door is opened or when the vehicle transmission is placed in park.

(2) DESCRIPTION OF RELATED ART INCLUDING INFORMATION DISCLOSED UNDER 37 CFR 1.97 AND 1.98

The prior art relates to occupancy alarm devices including a variety of vehicle occupancy alerts that includes a weight sensor that is placed beneath a child car seat. The prior art discloses an occupancy alert that includes a buckle sensor integrated into a belt of a child car seat to emit an alert when the belt of the child car seat is buckled. The prior art discloses a vehicle occupancy alarm device that includes a global positioning device that can be plugged into an on board diagnostic port of a vehicle. The prior art discloses an ornamental design for a telematic device that can be plugged into an on board diagnostic port of a vehicle.

(h) BRIEF SUMMARY OF THE INVENTION

An embodiment of the disclosure meets the needs presented above by generally comprising an alert unit that has an input port which is compatible with an on board diagnostic port thereby facilitating the alert unit to be placed in electrical communication with a computer system of a vehicle. The alert unit is actuatable into a first condition to emit an audible alert when the alert unit detects that a rear seat belt is coupled thereby alerting a driver of the vehicle that a passenger is buckled into the rear seat belt. The alert unit is actuatable into a second condition to emit an audible alert when the alert unit detects that the driver's side door is ajar thereby alerting the driver to check for a passenger in the rear seat. The alert unit is actuatable into a third condition to emit an audible alert when the alert unit detects that the vehicle transmission has been placed in a parking gear thereby alerting the driver to check for a passenger in the rear seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
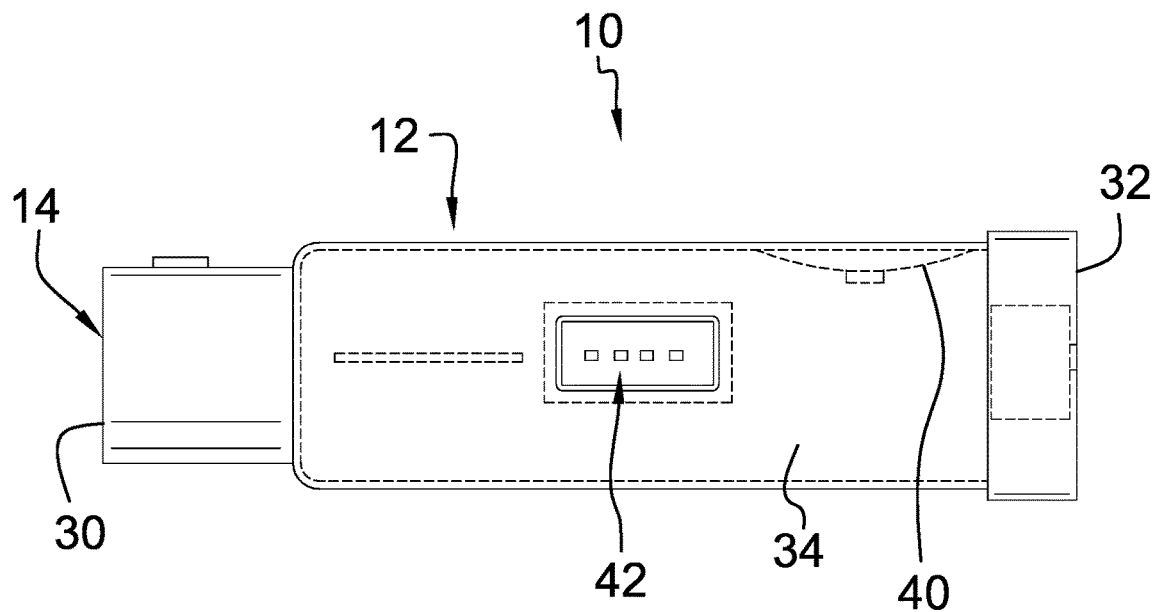
FIG. 1 is a left side phantom view of a vehicle occupancy alarm assembly according to an embodiment of the disclosure.
Figure 2:
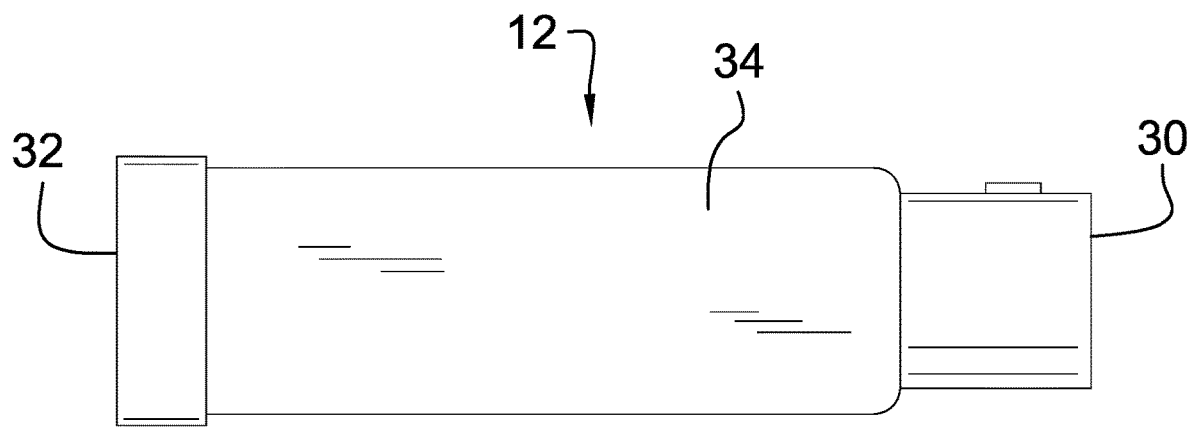
FIG. 2 is a right side view of an embodiment of the disclosure.
Figure 3:
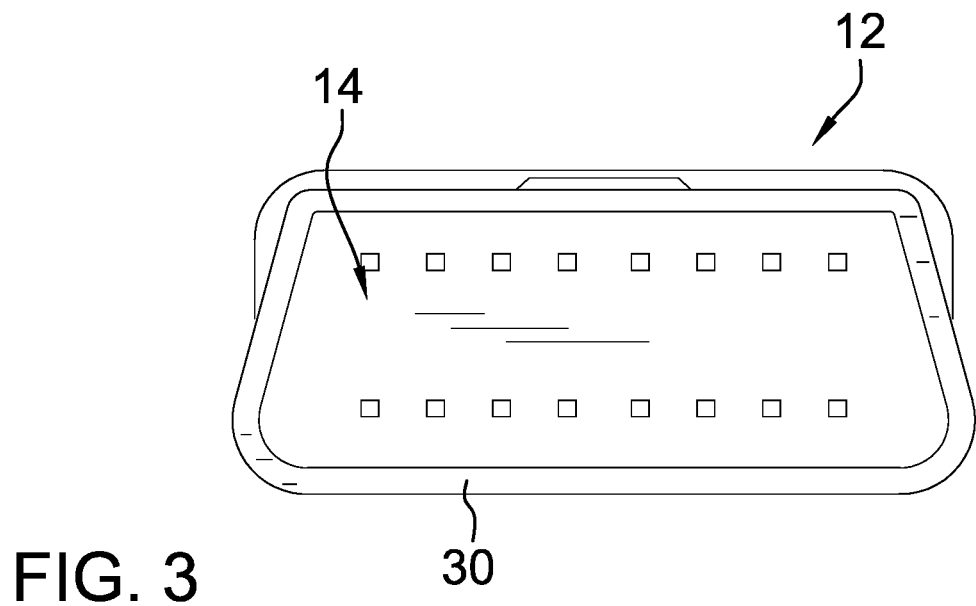
FIG. 3 is a front view of an embodiment of the disclosure.
Figure 4:
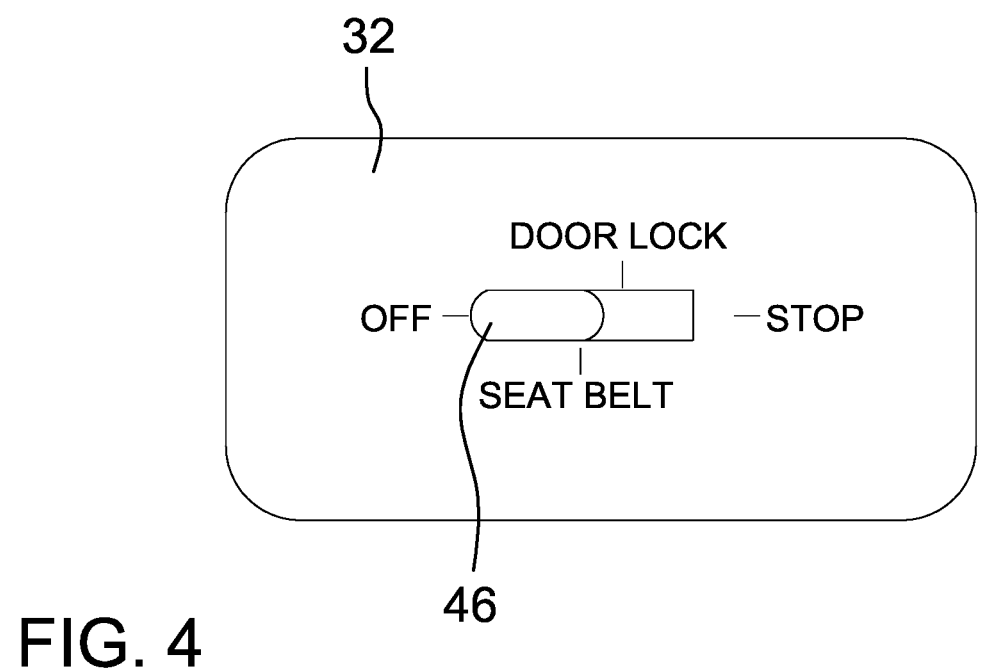
FIG. 4 is a back view of an embodiment of the disclosure.
Figure 5:
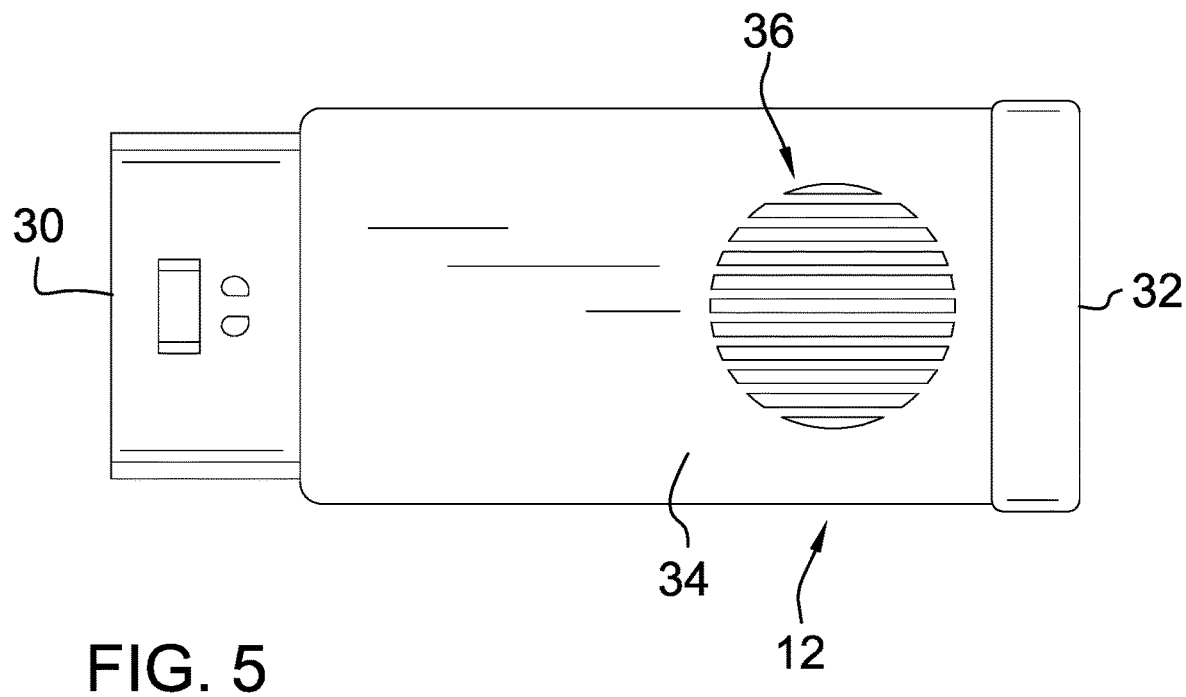
FIG. 5 is a top view of an embodiment of the disclosure.
Figure 6:
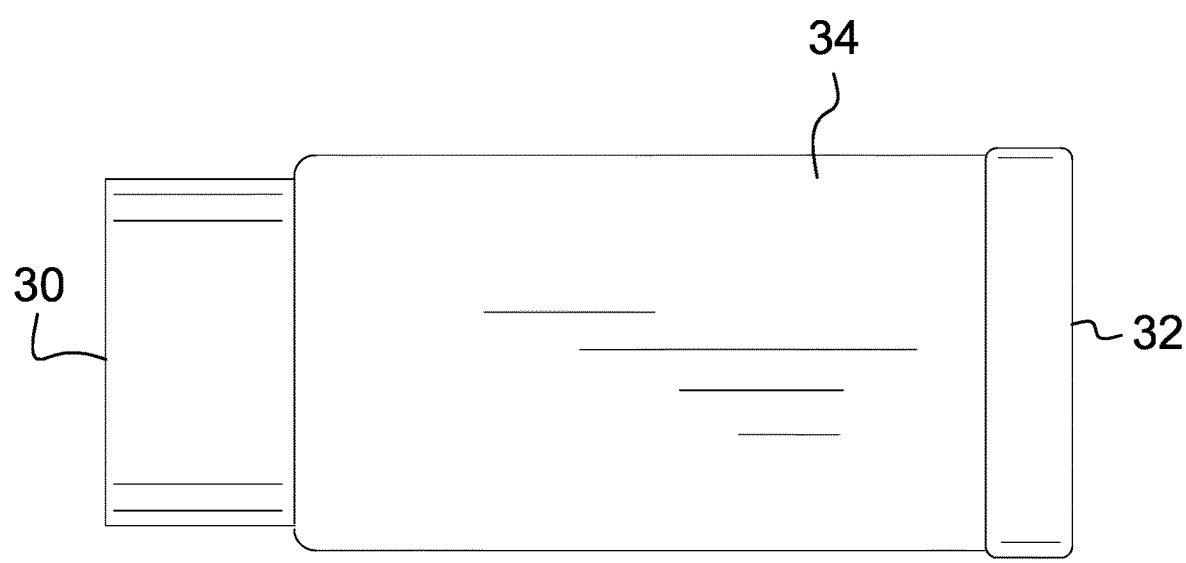
FIG. 6 is a bottom view of an embodiment of the disclosure.
Figure 7:
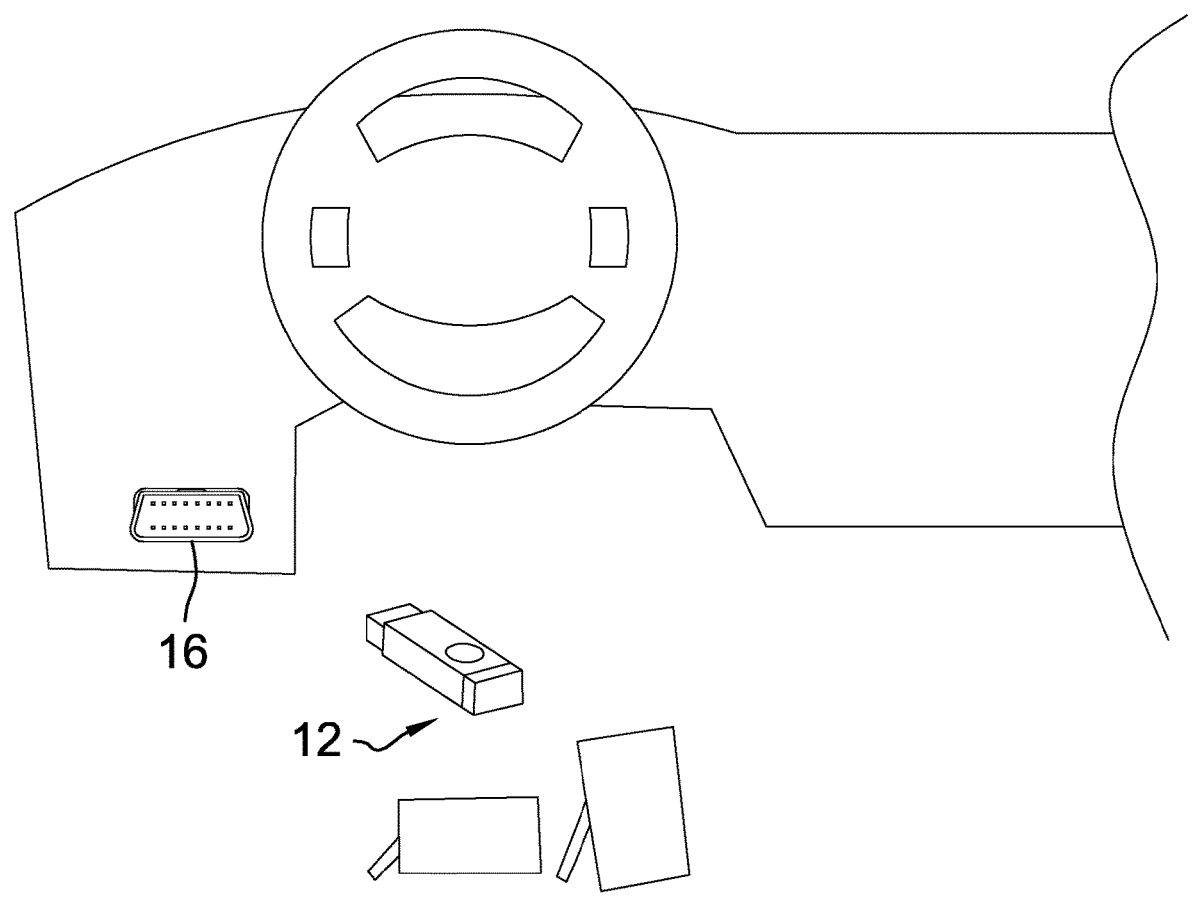
FIG. 7 is a perspective view of an embodiment of the disclosure showing an alert unit and an on board diagnostic port of a vehicle.
Figure 8:
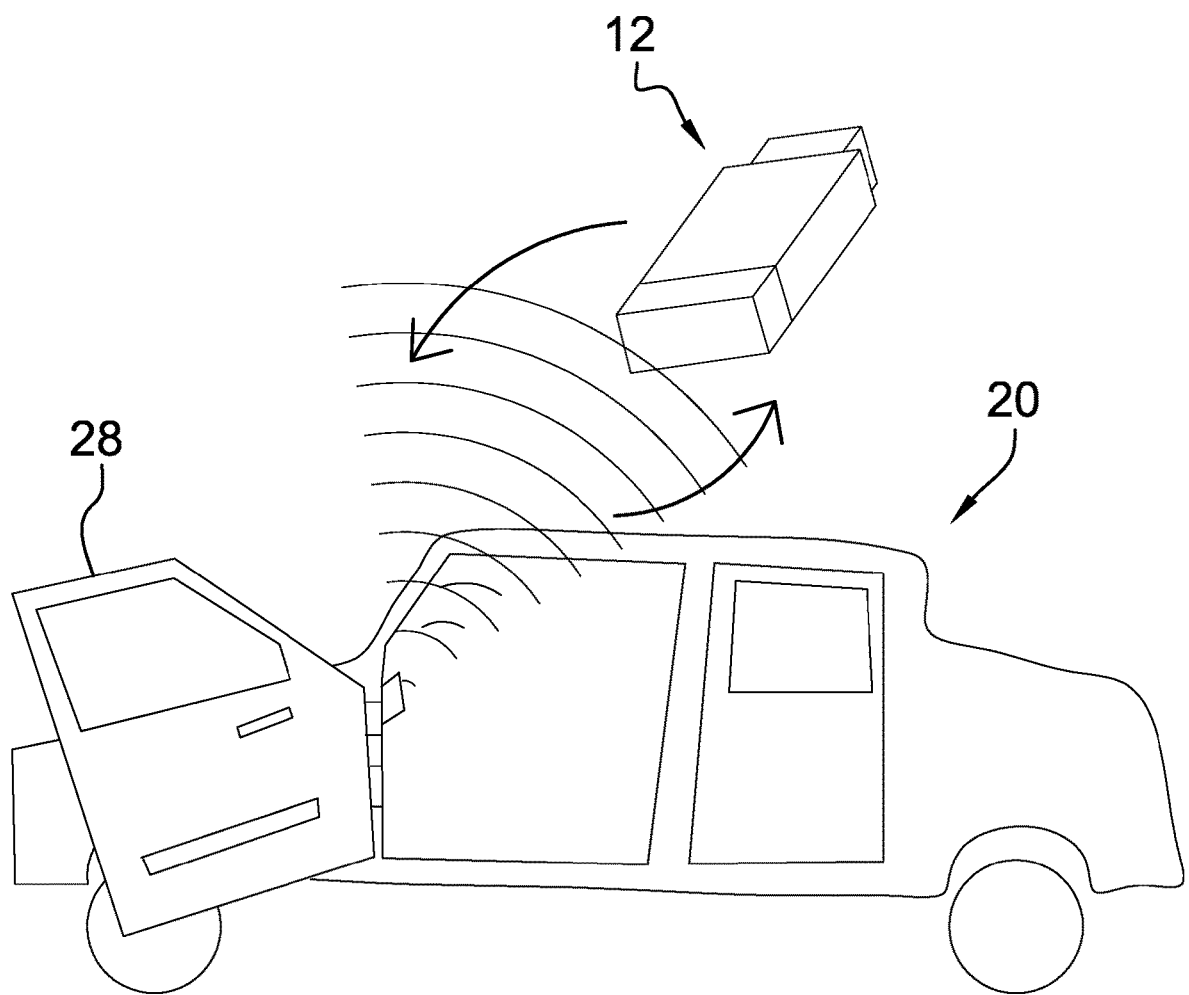
FIG. 8 is a perspective in-use view of an embodiment of the disclosure showing a driver's side door being opened.
Figure 9:
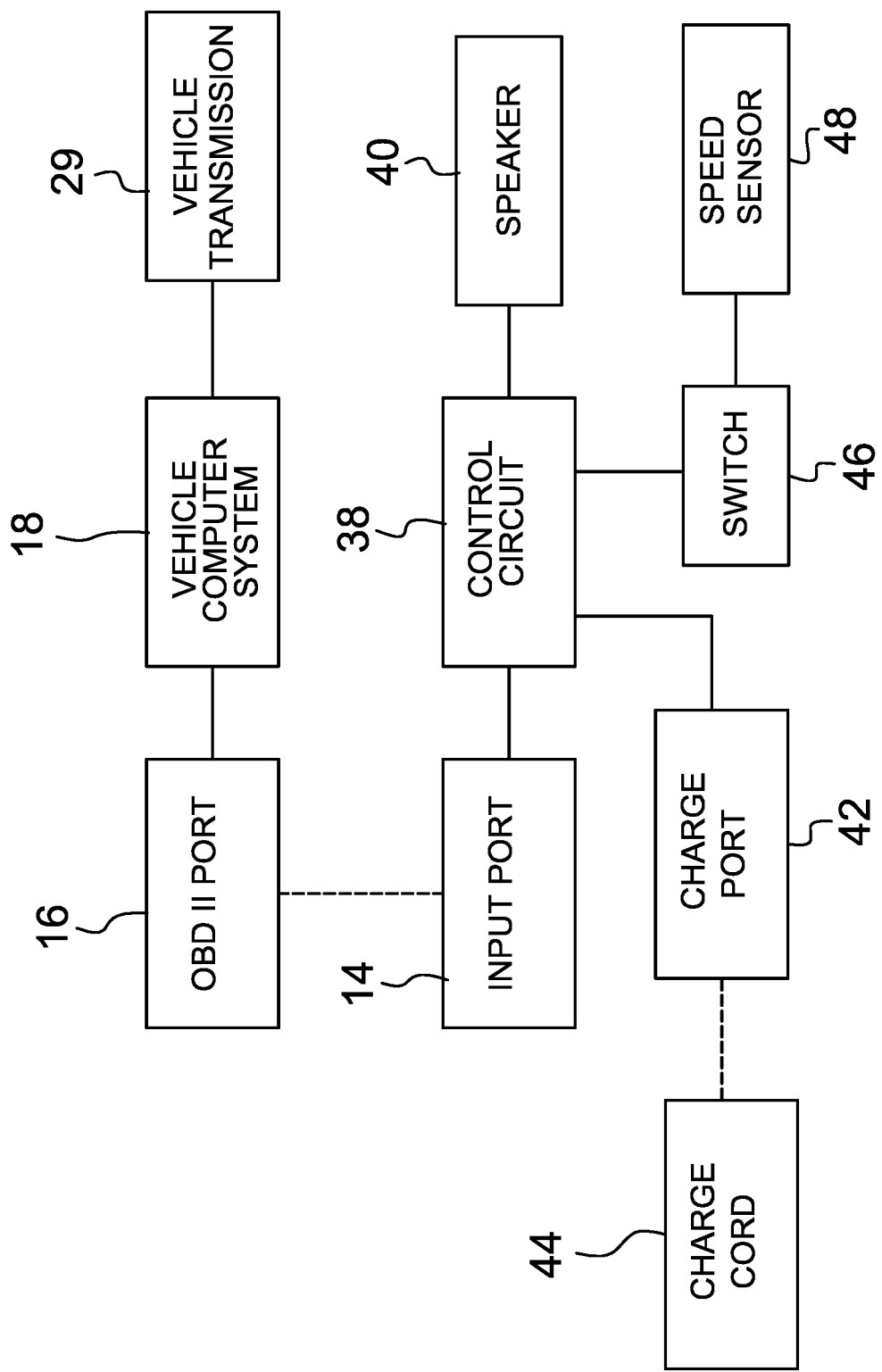
FIG. 9 is a schematic view of an embodiment of the disclosure.
Figure 10:
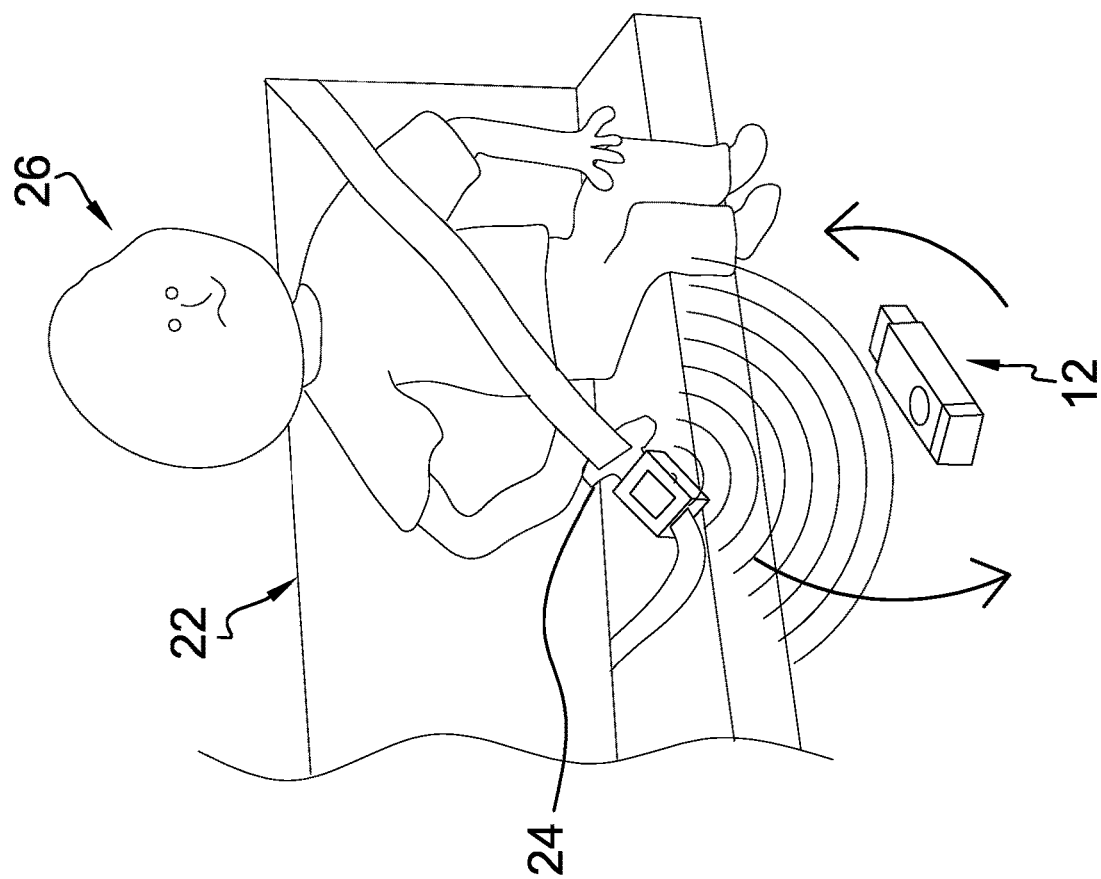
FIG. 10 is a perspective in-use view of an embodiment of the disclosure showing a passenger in a rear seat of a vehicle.

With reference now to the drawings, and in particular to FIGS. 1 through 10 thereof, a new occupancy alarm device embodying the principles and concepts of an embodiment of the disclosure and generally designated by the reference numeral 10 will be described.

As best illustrated in FIGS. 1 through 10, the vehicle occupancy alarm assembly 10 generally comprises an alert unit 12 that has an input port 14 which is compatible with an on board diagnostic port 16 thereby facilitating the alert unit 12 to be placed in electrical communication with a computer system 18 of a vehicle 20. The vehicle 20 may be a passenger vehicle which has a rear seat 22 or any other motorized vehicle that can be driven on public roadways. Additionally, the on board diagnostic port 16 may be an OBD2 port that is common to motorized vehicles.

The alert unit 12 is actuatable into a first condition having the alert unit 12 emitting an audible alert when the alert unit 12 detects that a rear seat belt 24 is coupled. In this way the alert unit 12 can alert a driver of the vehicle 20 that a passenger 26 is buckled into the rear seat belt 24 when the vehicle 20 has come to a complete stop for a pre-determined duration of time. The passenger 26 may be a child or other individual that is not capable of exiting the vehicle 20 without assistance. The alert unit 12 is actuatable into a second condition having the alert unit 12 emitting an audible alert when the alert unit 12 detects that the driver's side door 28 is ajar. In this way the alert unit 12 can alert the driver to check for a passenger 26 in the rear seat 22 when the driver opens the driver's side door 28. Furthermore, the alert unit 12 is actuatable into a third condition having the alert unit 12 emitting an audible alert when the alert unit 12 detects that the vehicle transmission 29 has been placed in a parking gear. In this way the alert unit 12 can alert the driver to check for a passenger 26 in the rear seat 22 when the driver places the vehicle transmission 29 in the parking gear.

The alert unit 12 comprises a housing 28 that has a first end 30, a second end 32 and an outer wall 34 extending between the first end 30 and the second end 32. The input port 14 is recessed into the first end 30 and the outer wall 34 has a plurality of speaker slots 36 each extending into an interior of the housing 28. The alert unit 12 includes a control circuit 38 that is positioned within the housing 28. The control circuit 38 is electrically coupled to the input port 14 such that the control circuit 38 is in electrical communication with the computer system 18 of the vehicle 20 when the input port 14 is plugged into the on board diagnostic port 16 of the vehicle 20.

The control circuit 38 receives a first alert input, a second alert input and a third alert input. The control circuit 38 receives the first alert input when the computer system 18 communicates to the control circuit 38 that the rear seat belt 24 is coupled. The control circuit 38 receives the second alert input when the computer system 18 communicates to the control circuit 38 that the driver's side door 28 is ajar. Furthermore, the control circuit 38 receives the third alert input when the computer system 18 communicates to the control circuit 38 that the vehicle's transmission 29 has been placed in the parking gear.

The alert unit 12 includes a speaker 40 that is positioned within the housing 28. The speaker 40 is aligned with the plurality of speaker slots 36 in the outer wall 34 of the housing 28 to emit audible sounds outwardly through the speaker slots 36. Additionally, the speaker 40 is electrically coupled to the control circuit 38. The speaker 40 is turned on when the control circuit 38 receives any of the first alert input or the second alert input or the third alert input.

A charge port 42 is recessed into the outer wall 34 of the housing 28 to receive a charge cord 44 of a personal electronic device for charging the personal electronic device. The charge port 42 is electrically coupled to the control circuit 38 such that the charge port 42 receives electrical power from the computer system 18 of the vehicle 20 when the input port 14 is plugged into the on board diagnostic port 16. The charge port 42 may comprise a universal serial bus port or other type of port that is commonly associated with personal electronic devices, such as a smart phone for example.

The alert unit 12 includes a switch 46 that is movably integrated into the second end 32 of the housing 28 such that the switch 46 can be manipulated by the driver of the vehicle 20, and the switch 46 is electrically coupled to the control circuit 38. The switch 46 is positionable in an off position thereby de-actuating the control circuit 38. The switch 46 is positionable in a seat belt position thereby facilitating the speaker 40 to be turned on when the control circuit 38 receives the first alert input. The switch 46 is positionable in a door lock position thereby facilitating the speaker 40 to be turned on when the control circuit 38 receives the second alert input. Additionally, the switch 46 is positionable in a stop position thereby facilitating the speaker 40 to be turned on when the control circuit 38 receives the third alert input. As is most clearly shown in FIG. 9, the control circuit 38 may be in communication with a speed sensor 48 of the vehicle 20 such that the control circuit 38 can detect when the vehicle 20 has come to a stop.

In use, the alert unit 12 is plugged into the on board diagnostic port 16 of the vehicle 20 and the switch 46 is positioned in either the seat belt position, the door lock position or the stop position, depending on the driver's preference. In this way the speaker 40 will emit the audible alert when the vehicle 20 is parked and the rear seat belt 24 is coupled to remind the driver that the passenger 26 is seated in the rear seat 22 when the switch 46 is in the seat belt position. The speaker 40 will emit the audible alert when the driver opens the driver's side door 28 when the switch 46 is in the door lock position to remind the driver to check for the passenger 26 in the rear seat 22. The speaker 40 will emit the audible alert when the driver puts the vehicle transmission 29 in the park gear when the switch 46 is in the stop position to remind the driver to check for the passenger 26 in the rear seat 22. In this the driver can be reminded to assist the passenger 26 to exit the vehicle 20 in whichever manner the driver feels will be best suited to their individual situation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A vehicle occupancy alarm assembly for alerting a driver of a vehicle that a child is seated in a rear seat of the vehicle, said assembly comprising:

an alert unit having an input port being compatible with an on board diagnostic port thereby facilitating said alert unit to be placed in electrical communication with a computer system of the vehicle, said alert unit being actuatable into a first condition having said alert unit emitting an audible alert when said alert unit detects that a rear seat belt is coupled wherein said alert unit is configured to alert the driver of the vehicle that the child is buckled into the rear seat belt, said alert unit being actuatable into a second condition having said alert unit emitting the audible alert when said alert unit detects that a driver's side door is ajar wherein said alert unit is configured to alert the driver to check for the child in the rear seat, said alert unit being actuatable into a third condition having said alert unit emitting the audible alert when said alert unit detects that the vehicle's transmission has been placed in a parking gear wherein said alert unit is configured to alert the driver to check for the child in the rear seat;

wherein said alert unit comprises a housing having a first end, a second end and an outer wall extending between said first end and said second end, said input port being recessed into said first end, said outer wall having a plurality of speaker slots each extending into an interior of said housing;

wherein said alert unit includes a control circuit being positioned within said housing, said control circuit being electrically coupled to said input port such that said control circuit is in electrical communication with the computer system of the vehicle when said input port is plugged into the on board diagnostic port of the vehicle, said control circuit receiving a first alert input, said control circuit receiving a second alert input, said control circuit receiving a third alert input;

wherein said control circuit receives said first alert input when the computer system communicates to said control circuit that the rear seat belt is coupled;

wherein said control circuit receives said second alert input when the computer system communicates to said control circuit that the driver's side door is ajar;

wherein said control circuit receives said third alert input when the computer system communicates to said control circuit that the vehicle's transmission has been placed in the parking gear;

wherein said alert unit includes a speaker being positioned within said housing, said speaker being aligned with said plurality of speaker slots in said outer wall of said housing wherein said speaker is configured to emit the audible alerts outwardly through said plurality of speaker slots, said speaker being electrically coupled to said control circuit, said speaker being turned on when said control circuit receives any of said first alert input or said second alert input or said third alert input;

wherein said alert unit includes a switch being movably integrated into said second end of said housing wherein said switch is configured to be manipulated by the driver of the vehicle, said switch being electrically coupled to said control circuit;

wherein said switch is positionable in an off position thereby de-actuating said control circuit;

wherein said switch is positionable in a seat belt position thereby facilitating said speaker to be turned on when said control circuit receives said first alert input;

wherein said switch is positionable in a door lock position thereby facilitating said speaker to be turned on when said control circuit receives said second alert input; and wherein said switch is positionable in a stop position thereby facilitating said speaker to be turned on when said control circuit receives said third alert input.

2. The assembly according to claim 1, wherein said alert unit includes a charge port being recessed into said outer wall of said housing.

3. A vehicle occupancy alarm assembly for alerting a driver of a vehicle that a child is seated in a rear seat of the vehicle, said assembly comprising:

an alert unit having an input port being compatible with an on board diagnostic port thereby facilitating said alert unit to be placed in electrical communication with a computer system of the vehicle, said alert unit being actuatable into a first condition having said alert unit emitting an audible alert when said alert unit detects that a rear seat belt is coupled wherein said alert unit is configured to alert the driver of the vehicle that the child is buckled into the rear seat belt, said alert unit being actuatable into a second condition having said alert unit emitting the audible alert when said alert unit detects that a driver's side door is ajar wherein said alert unit is configured to alert the driver to check for the child in the rear seat, said alert unit being actuatable into a third condition having said alert unit emitting the audible alert when said alert unit detects that the vehicle's transmission has been placed in a parking gear wherein said alert unit is configured to alert the driver to check for the child in the rear seat, said alert unit comprising:

a housing having a first end, a second end and an outer wall extending between said first end and said second end, said input port being recessed into said first end, said outer wall having a plurality of speaker slots each extending into an interior of said housing;

a control circuit being positioned within said housing, said control circuit being electrically coupled to said input port such that said control circuit is in electrical communication with the computer system of the vehicle when said input port is plugged into the on board diagnostic port of the vehicle, said control circuit receiving a first alert input, said control circuit receiving a second alert input, said control circuit receiving a third alert input, said control circuit receiving said first alert input when the computer system communicates to said control circuit that the rear seat belt is coupled, said control circuit receiving said second alert input when the computer system communicates to said control circuit that the driver's side door is ajar, said control circuit receiving said third alert input when the computer system communicates to said control circuit that the vehicle's transmission has been placed in the parking gear;

a speaker being positioned within said housing, said speaker being aligned with said plurality of speaker slots in said outer wall of said housing wherein said speaker is configured to emit the audible alerts outwardly through said plurality of speaker slots, said speaker being electrically coupled to said control circuit, said speaker being turned on when said control circuit receives any of said first alert input or said second alert input or said third alert input;

a charge port being recessed into said outer wall of said housing wherein said charge port is configured to receive a charge cord of a personal electronic device for charging the personal electronic device, said charge port being electrically coupled to said control circuit such that said charge port receives electrical power from the computer system of the vehicle when said input port is plugged into the on board diagnostic port; and a switch being movably integrated into said second end of said housing wherein said switch is configured to be manipulated by the driver of the vehicle, said switch being electrically coupled to said control circuit, said switch being positionable in an off position thereby de-actuating said control circuit, said switch being positionable in a seat belt position thereby facilitating said speaker to be turned on when said control circuit receives said first alert input, said switch being positionable in a door lock position thereby facilitating said speaker to be turned on when said control circuit receives said second alert input, said switch being positionable in a stop position thereby facilitating said speaker to be turned on when said control circuit receives said third alert input.

\* \* \* \* \*